(12) United States Patent
Sjögren et al.

(10) Patent No.: US 11,934,157 B2
(45) Date of Patent: Mar. 19, 2024

(54) METHOD FOR ANALYZING ENERGY USED FOR PRODUCING A UNIT OF MASS OR VOLUME OF COMPRESSED GAS (SPECIFIC ENERGY CONSUMPTION)

(71) Applicant: Enersize OY

(72) Inventors: Anders Sjögren, Lund (SE); Christian Merheim, Helsingborg (SE); Xiaohui Wang, Limhamn (SE)

(73) Assignee: ENERSIZE OY, Helsinki (FI)

( * ) Notice: Subject to any disclaimer, the term of this patent is extended or adjusted under 35 U.S.C. 154(b) by 582 days.

(21) Appl. No.: 17/273,298

(22) PCT Filed: Aug. 22, 2019

(86) PCT No.: PCT/EP2019/072491
§ 371 (c)(1),
(2) Date: Mar. 3, 2021

(87) PCT Pub. No.: WO2020/048785
PCT Pub. Date: Mar. 12, 2020

(65) Prior Publication Data
US 2021/0397144 A1    Dec. 23, 2021

(30) Foreign Application Priority Data

Sep. 3, 2018 (SE) .................................. 1851039-6

(51) Int. Cl.
*G05B 13/04* (2006.01)
*F04B 49/06* (2006.01)
(Continued)

(52) U.S. Cl.
CPC ............ *G05B 13/04* (2013.01); *F04B 49/065* (2013.01); *F04C 28/28* (2013.01); *G06F 17/11* (2013.01);
(Continued)

(58) Field of Classification Search
CPC ..... G05B 13/04; G05B 23/021; F04B 49/065; F04C 28/28; F04C 2270/80; G06F 17/11; G06Q 50/06
(Continued)

(56) References Cited

U.S. PATENT DOCUMENTS

2002/0188422 A1   12/2002   Derose et al.
2003/0065423 A1    4/2003   Vanderbeek
(Continued)

OTHER PUBLICATIONS

Staroselsky et al., "Parallel centrifugal gas compressors can be controlled more effectively", Technology Nov. 3, 1986, Oil & Gas Journal, p. 78-82.
(Continued)

*Primary Examiner* — Michael J Brown
(74) *Attorney, Agent, or Firm* — MOSER TABOADA

(57) ABSTRACT

The present invention relates to a method for analyzing energy used for producing a unit of mass or volume of compressed gas (Specific Energy Consumption) in relation to a common output flow in a compressor system, said method comprising the following steps: —for time interval, $T_{ref}$, collecting reference measured data points of common output flow $F_{ref}$ and energy (or power) consumption $E_{ref}$ (or $P_{ref}$) in the compressor system; —calculating energy (or power) use as a function of the common output flow $E_{ref}(F)$ (or $<P_{ref}>_t(F)$) from the measured data points and calculating volume output as a function of the common output flow $V_{ref}(F)$: —calculating average energy consumed for producing a unit of mass or volume of compressed gas as a function of the common output flow $<SEC_{ref}>_t(F)$ from equation $E_{ref}(F)/V_{ref}(F)$ (Or $<P_{ref}>_t/P_{ref}$); —for time interval, $T_{sav}$, collecting measured data points of common output flow $F_{sav}$ and energy (or power) consumption $E_{sav}$ ($P_{sav}$) in the compressor system; —calculating energy consumed for producing a unit of mass or volume of compressed gas as a function
(Continued)

c.
$<SEC_{ref}>_t(F_{sav}) = f(F)$, where $f(max(F_{ref})) = <SEC_{ref}>_t(max(F_{ref}))$ and $f(F)$ is piecewise continuous.

of the common output flow $<SEC_{sav}>_t(F)$ from equation $E_{sav}(F)/V_{sav}(F)$ (or $<P_{sav}>_t(F)/F$ sav) or $SEC_{sav}(t,F)$ from $P_{sav}/F_{sav}$; —calculating the difference between $<SEC_{ref}>_t(F)$ and $<SEC_{sav}>_t(F)$ or $SEC_{sav}(t,F)$ over a range of common output flow F in the compressor system.

24 Claims, 4 Drawing Sheets

(51) Int. Cl.
    *F04C 28/28*     (2006.01)
    *G06F 17/11*     (2006.01)
    *G06Q 50/06*     (2012.01)
    *G05B 23/00*     (2006.01)

(52) U.S. Cl.
    CPC .......... *G06Q 50/06* (2013.01); *F04C 2270/80* (2013.01)

(58) Field of Classification Search
    USPC ......................................................... 700/29
    See application file for complete search history.

(56) References Cited

U.S. PATENT DOCUMENTS

| | | |
|---|---|---|
| 2005/0278144 A1 | 12/2005 | Zuercher et al. |
| 2010/0082293 A1* | 4/2010 | Mitchell ............ G05B 19/0428 702/182 |
| 2015/0220670 A1 | 8/2015 | Linehan et al. |
| 2016/0252091 A1 | 9/2016 | Wagner et al. |

OTHER PUBLICATIONS

Mousavi et al., "Energy Efficiency of Compressed Air Systems", 21st CIRP Conference on Life Cycle Engineering, School of Mechanical and Manufacturing Engineering, Sustainable Engineering and Life Cycle Engineering Research Group, the University of New South Wales, Sydney, Australia, Procedia CIRP 15 (2014) 313-318, doi: 10.1016/j.procir.2014.06.026.

Sean et al. "Simulating Energy Efficient Control of Multiple-Compressor Compressed Air Systems" (2015), Mechanical and Aerospace Engineering Faculty Publications. Paper 144, http://ecommons.udayton.edu/mee_fac_pub/144.

Jarvisalo Markus et al: "Soft-Sensor-Based Flow Rate and Specific Energy Estimation of Industrial Variable-Speed-Driven Twin Rotary Screw Compressor", IEEE Transactions on Industrial Electronics, IEEE Service Center, Piscataway, NJ, USA, vol. 63, No. 5, May 1, 2016 (May 1, 2016), pp. 3282-3289, XP011605659, ISSN: 0278-0046, DOI: 10.1109/TIE.2016.2527621 [retrieved on Apr. 8, 2016] the whole document.

Corsini A et al: "Multivariate KPI for Energy Management of Cooling Systems in Food Industry", Energy Procedia, Elsevier, NL, vol. 101, Dec. 29, 2016 (Dec. 29, 2016), pp. 297-304, XP029870264, ISSN: 1876-6102, DOI: 10.1016/J.EGYPRO.2016.11.038 the whole document.

International Search Report, International application No. PCT/EP2019/072497, dated Nov. 22, 2019.

\* cited by examiner $$\langle SEC \rangle_t(F) = E(F)/V(F)$$
$$SEC(t,F) = P/F$$

$$\langle SEC_{ref} \rangle_t(F) = E_{ref}(F)/V_{ref}(F)$$

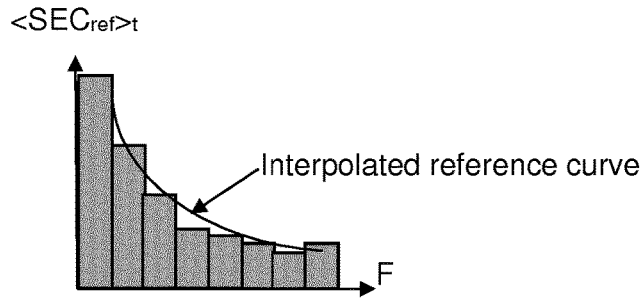
Fig. 3
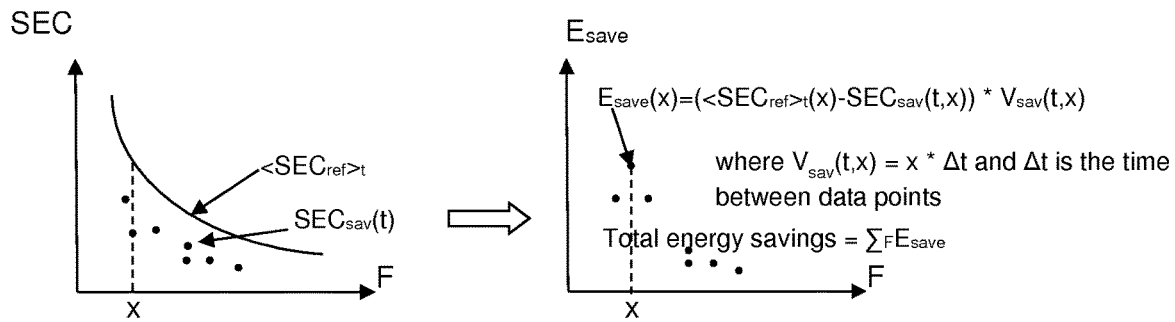
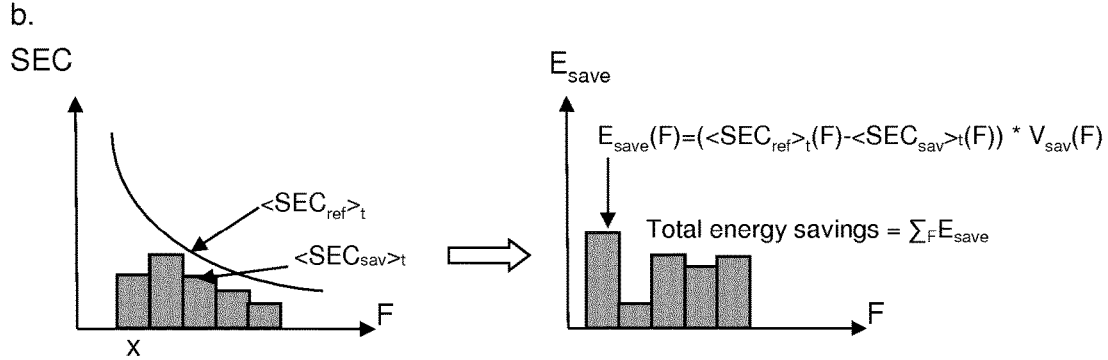
Fig. 4 a-b

When $F_{sav} > \max(F_{ref})$:

a.
$<SEC_{ref}>_t(F_{sav}) = <<SEC_{ref}>_t>_V = \sum_F E_{ref} / \sum_F V_{ref}$ b.
$<SEC_{ref}>_t(F_{sav}) - <SEC_{sav}>_t(F_{sav}) =$
$<SEC_{ref}>_t(\max(F_{ref})) - <SEC_{sav}>_t(\max(F_{ref}))$

Fig. 5 a-b c.
$<SEC_{ref}>_t(F_{sav}) = f(F)$, where $f(max(F_{ref})) = <SEC_{ref}>_t(max(F_{ref}))$ and $f(F)$ is piecewise continuous.

METHOD FOR ANALYZING ENERGY USED FOR PRODUCING A UNIT OF MASS OR VOLUME OF COMPRESSED GAS (SPECIFIC ENERGY CONSUMPTION)

FIELD OF THE INVENTION

The present invention relates to a method for analyzing energy used for producing a unit of mass or volume of compressed gas (Specific Energy Consumption) in relation to a common output flow in a compressor system, said method comprising the following steps, said method involving measuring real data and calculating the efficiency of a compressor system, especially when comparing real data against a reference.

TECHNICAL BACKGROUND

To log data och analyze the same is known, also in the field of evaluating compressor systems. For instance, in US2010/0082293 there is disclosed technique& intended to provide robust, comprehensive measurement and analysis for optimizing efficiency of compressed air systems. The techniques provided may be implemented, for example, in a network appliance local to the target compressed air system, and/or in a server configured to remotely monitor and evaluate the target system. On-site data logging as well as on-site or remote data analysis may be enabled, along with onboard data consolidation. The data analysis may be directed to detecting or analyzing unexpected data, and may also involve an alert function. Furthermore, a data analysis module may further be programmed or otherwise configured for establishing an airflow-to-power consumption profile of the compressed air system, which profile is based on actual power consumed by the system, airflow required by the facility, and air pressure provided to the facility. The data analysis module may further be configured for optimizing supply of compressed air to the compressed air system with a refined view of compressed air usage based on reduced demand, by identifying air compressors and/or supply-side equipment that are properly sized for the compressed air system.

The present invention, in contrast to US2010/0082293, is directed to measuring real data and using the same to monitor the efficiency changes of a compressor system.

SUMMARY OF THE INVENTION

The stated purpose above is achieved by a method for analyzing energy used for producing a unit of mass or volume of compressed gas (Specific Energy Consumption) in relation to a common output flow in a compressor system, said method comprising the following steps:

for time interval, $T_{ref}$, collecting reference measured data points of common output flow $F_{ref}$ and energy (or power) consumption $E_{ref}$ (or $P_{ref}$) in the compressor system;

calculating energy (or power) use as a function of the common output flow $E_{ref}(F)$ (or $<P_{ref}>_t(F)$) from the measured data points and calculating volume output as a function of the common output flow $V_{ref}(F)$;

calculating average energy consumed for producing a unit of mass or volume of compressed gas as a function of the common output flow $<SEC_{ref}>_t(F)$ from equation $E_{ref}(F)/V_{ref}(F)$ (or $<P_{ref}>_t(F)/F_{ref}$);

for time interval, $T_{sav}$, collecting measured data points of common output flow $F_{sav}$ and energy (or power) consumption $E_{sav}$ ($P_{sav}$, lin the compressor system;

calculating energy consumed for producing a unit of mass or volume of compressed gas as a function of the common output flow $<SEC_{sav}>_t(F)$ from equation $E_{sav}(F)/V_{sav}(F)$ (or $<P_{sav}>_t(F)/F_{sav}$) or $SEC_{sav}(t,F)$ from $P_{sav}/F_{sav}$;

calculating the difference between $<SEC_{ref}>_t(F)$ and $<SEC_{sav}>_t(F)$ or $SEC_{sav}(t,F)$ over a range of common output flow F in the compressor system.

The expression "energy used for producing a unit of mass or volume of compressed gas" or "Specific Energy Consumption" is sometimes called SEC in the compressor industry, which, just to give an example, may be expressed in the unit $kWh/Nm^3$ or kWh/kg, or may be expressed as volume per energy unit, e.g. $Nm^3/kWh$ (where $Nm^3$ means "normal cubic meter", i.e. the volume of gas produced at normal atmospheric pressure and standard temperature, usually of 0 or 15° C.). Another commonly used standardized expression used as an alternative to specific energy consumption is specific power consumption (SPC or SP), which often is measured in the unit $kW/(Nm^3/min)$, and this and other equivalents may also be used according to the present invention. In this context it may be said that the expression specific energy consumption may refer to both energy/produced mass or volume unit and produced mass or volume unit/used energy unit.

The method according to the present invention provides several advantages. First of all, current energy saving calculations on compressor systems are normally done by comparing energy consumptions over long time before and after a specific amendment to a specific compressor system. This is of course both time consuming and lacking the tools and measures for relating the energy saving to specific optimization measures made in the compressor system. The method according to the present invention, however, provides the possibility of calculating the energy saving obtained by a certain change in a compressor system, e.g. modification of the compressor combinations for specific flow ranges, within a very short time range after the change has been made.

Moreover, it should be noted that the present invention may either be directed to calculating SEC or 1/SEC, which should be seen as equivalent in relation to the scope of the present invention.

Furthermore, the method according to the present invention may be used on all types of compressor systems, both single compressor systems and multiple compressor systems. Furthermore, the method according to the present invention is especial interest for real physical compressor systems, i.e. operational compressor systems. It should however be noted that the method may be performed in simulations and calculations on test data, however this is not the intended focus of the present invention. Furthermore, and as is further discussed below, the method according to the present invention may be employed after an optimization or change has been made to a compressor system.

Specific Embodiments of the Invention

Below specific embodiments of the present invention are disclosed. According to one specific embodiment of the present invention, the method involves using $E_{ref}(F)$, $V_{ref}(F)$, $P_{sav}$, $F_{sav}$ and $E_{ref}(F)/V_{ref}(F)$ and $P_{sav}/F_{sav}$ in the calculations.

Moreover, according to another embodiment, the method involves collecting data during $T_{ref}$, then performing changes to the compressed air system, then collecting data during the time interval $T_{sav}$, and finally comparing the data. This embodiment implies that the present invention may also comprise an active step to change the operation of the compressed system and then collecting data again to enable to evaluate the effect of the change.

According to yet another embodiment of the present invention, the $<SEC_{ref}>_t(F)$ and $V_{ref}(F)$ are partly or fully simulated, constructed or are from a different compressed system than $<SEC_{sav}>_t(F)$ (or $SEC_{sav}(t,F)$) and $V_{sav}(F)$ (or $V_{sav}(t,F)$). This enables to compare different processes inside of one and the same factory, different factories and also to create benchmarking best practice SEC curves and compare specific compressor systems with these best practice SEC curves.

It should be noted that the method according to the present invention may be utilized on the full range of measured data points or only parts thereof. Therefore, according to one specific embodiment of the present invention, the steps of calculating are performed over the full range of common output flow F in the measured data points during $T_{sav}$. According to yet another embodiment, the measurement during $T_{sav}$ is performed on a single data point. Moreover, according to yet another embodiment, the method involves using only a subset of the data during $T_{ref}$ or $T_{sav}$.

The method according to the present invention may also involve detecting data points involving data errors and marking or removing these error data points before the calculations are performed. Such errors may be the result of sensors not working as intended, incorrect installation, and e.g. that the system is not operating as intended. Moreover, the data may also be handled so that time periods with such errors are removed completely from the total set of data.

The present invention is also directed to calculating and visualizing the energy saving obtained after a certain change in a compressor system. Therefore, according to one specific embodiment, the energy saving at flow F is calculated as $E_{SAVE}(F)=(<SEC_{ref}>_t(F)-<SEC_{sav}>_t(F))*V_{sav}(F)$ or $E_{SAVE}(F)=(<SEC_{ref}>_t(F)-SEC_{sav}(t,F))*V_{sav}(t,F)$ where F refers to any common output flow over the full range of measured data points. Furthermore, according to yet another embodiment of the present invention, the total energy saving is calculated as $\Sigma_F E_{SAVE}(F)$. Moreover, according to yet another embodiment, the total cost saving is calculated as $\Sigma_F E_{SAVE}(F)*Cost$, where Cost is the cost in any monetary instrument per unit of energy.

As mentioned above, also simulations may be part of the steps according to present invention. As an example, according to one embodiment, wherein $SEC_{sav}(t,F)$ and $V_{sav}(t,F)$ are simulated data to analyze savings for a simulated period in time $T_{sav}$. This may e.g. be performed for the purpose of estimating energy saving of a specific optimization measure so as to justify the implementation of such a measure, and/or single out the part of energy saving of such a mesure when analyzing the contribution factors to the total energy saving.

Moreover, visualizing graphs may also be a part of the present invention. Therefore, according to one specific embodiment, any or several of the functions of $E_{ref}(F)$, $<P_{ref}>(F)$, $V_{ref}(F)$, $<SEC_{ref}>_t(F)$ and energy saving $E_{SAVE}(F)$ are plotted as a function against F.

The method according to the present invention may also involve calculating SEC and energy saving for any flow level, i.e. flow levels also outside of the measured data set. Therefore, according to one specific embodiment of the present invention, $<SEC_{ref}>_t(F)$ is calculated for a F having no measured data during $T_{ref}$. This may e.g. be of interest to enable to perform a reference measurement in one flow range to then enable to run a compressor system and calculate the energy savings in a different flow range. According to one embodiment of the present invention, interpolation and extrapolation is used to accomplish this.

Furthermore, the present method may also involve deciding $<SEC_{ref}>_t(F)$ for a F larger than the highest F measured, $max(F_{ref})$, in the data points during $T_{ref}$. Such a flow (F) level may e.g. be higher than the measured flow data set. Such a higher F may for instance be caused by the addition of one or more compressors or by a modification of existing compressors in a compressor system.

There are different ways according to the present invention with reference to calculating SEC for flows outside of the measured data set, i.e. extrapolating the data.

According to one specific embodiment of the present invention, $<SEC_{ref}>_t(F)$ for a F larger than $max(F_{ref})$ in the data points is set and calculated as: $<SEC_{ref}>_t(F>max(F_{ref}))=<<SEC>_t>_v=\Sigma_F E_{ref}(F)/\Sigma_F V_{ref}(F)$. In this case the volume weighted average value of all average values of SEC sets the $<SEC_{ref}>_t(F)$.

According to yet another embodiment, the $<SEC_{ref}>_t(F)$ for a F larger than $max(F_{ref})$ in the data points is set and calculated by calculating Δ (difference) of $<SEC_{ref}>_t(F)$ and $<SEC_{sav}>_t(F)$ or $SEC_{sav}(t,F)$ at $max(F_{ref})$ during $T_{ref}$ and using the same Δ for a F larger than $max(F_{ref})$ in the data points.

Moreover, according to yet another specific embodiment, the $<SEC_{ref}>_t(F)$ for a F larger or smaller than the highest or lowest F measured during $T_{ref}$ is modelled as a continuous extrapolation of $<SEC_{ref}>_t(F)$, e.g a piecewise continuous extrapolation (see FIG. 5c). The extrapolation may be performed in different ways according to the present invention. According to one embodiment, the model that is used to extrapolate $<SEC>_{ref}(F)$ includes the situation that one or several compressors are operating their blow off valves. According to yet another embodiment, the model that is used to extrapolate $<SEC_{ref}>_t(F)$ includes the situation that one or several compressors are regulating using IGVs (inlet guide vanes) or VSDs (variable speed drives). Furthermore, it should be noted that combinations of the above, i.e. of different forms of extrapolations, may be used in the method according to the present invention.

There are many different practical uses when extrapolation may be applied. For example, the extrapolation may be combined with the calculation of one or several compressors, and then the contribution of the power of said one or more compressors may be deleted from the calculation of the energy saving. One example when this may be applied is if a compressor breaks down or if an additional new compressor is added into the compressor system. In relation to the present invention it should be noted that the expression "calculation(s)" may in this regard be interpreted as "energy characteristic(s) derived from theoretic models or measurements".

Moreover, the method according to the present invention may also involve other parameters in the model calculations. Therefore, according to one specific embodiment, the method comprises calculating and setting different $<SEC_{ref}>_t(F)$ curves as a function of F for different values of a third parameter. This addition to the present invention may provide a 3D calculation in which an added axis in the graph represents the third parameter.

Specific Energy Consumption varies with pressure. It is well known throughout literature in the field of thermodynamics, that effects of pressure changes on compressor efficiency can be estimated. One common method is by using a non-reversible polytrophic compression process to estimate the effect of a pressure changes on the compressors workload and thus its specific energy consumption. The proposed method according to the present invention decouples the pressure effects from the operating model giving an advantage over other methods as the reference pressure for the model can be freely selected, changed or adjusted while the effects of the pressure changes can still be taken into account in the calculations.

As may be understood from above, according to one embodiment of the method according to the present invention, the third parameter is operational pressure for the compressor system. It may be of interest to provide an efficiency profile before and after a pressure adjustment, respectively, where the changes afterwards may be quantified with reference to both pressure and flow.

Also the visualization of a 3D graph may be of interest according to the present invention. Therefore, according to one embodiment, the method also comprises plotting the different $<SEC_{ref}>_t(F)$ curves to set a $<SEC_{ref}>_t(F, X)$ plane as a function of F and the third parameter, X.

Moreover, the method according to the present invention may be used on any type compressor system, such as air compressors, or compressors operating with another type of gas instead of air, or even steam generators (boilers), single as well as multiple systems. According to one specific embodiment, the method according to the present invention is used on air compressors. According to another specific embodiment of the present invention, the method according to the present invention is intended for a system comprising multiple compressors, e.g. multiple air compressors.

DESCRIPTION OF THE DRAWINGS

Below, descriptions of the drawings are presented.

In relation to the claims, description and drawings it should be noted that reference is often shortened as "ref", sample as "say" and time as "t". Moreover, and as is clear from above, energy is set as "E" and flow as "F". This is further explained below in the section "nomenclature".

Figures 1, 2:
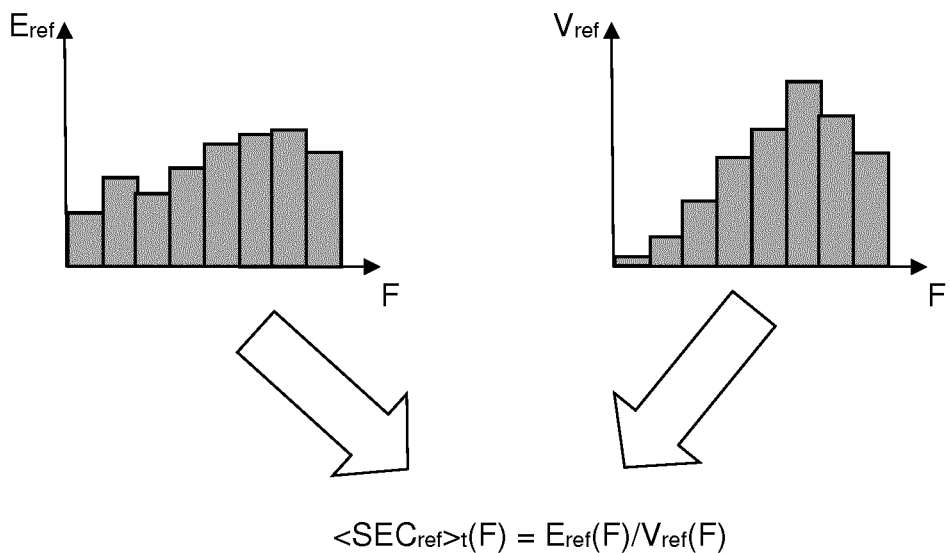
In FIG. 1 there is presented the basic equation models which form the starting point of the method according to the present invention. The time average SEC, i.e. $<SEC>_t$ for some time period, and as a function of flow F is obtained from $E(F)/V(F)$. This may be one starting point for the method according to the present invention. Another route is via P/F, which then provides the instantaneous SEC at a certain time and flow, i.e. SEC(t,F). It should be noted that it is further possible to perform the calculation $<SEC>_t = <P>_t(F)/F$, i.e. calculate the time average power at a certain flow for some time period, then divide with that flow. This last route gives the same result as E/V, because $<P>(F)*$(time spent producing air at flow F)=E(F).
In FIG. 2 there is provided a graph visualization of a next step of the method according to the present invention. By use of the measured data points of E and V over the flow range, the value of $<SEC_{ref}>_t(F)$ may be calculated from the equation $E_{ref}(F)/V_{ref}(F)$, as understood from the description above in relation to FIG. 1.
Figure 4:
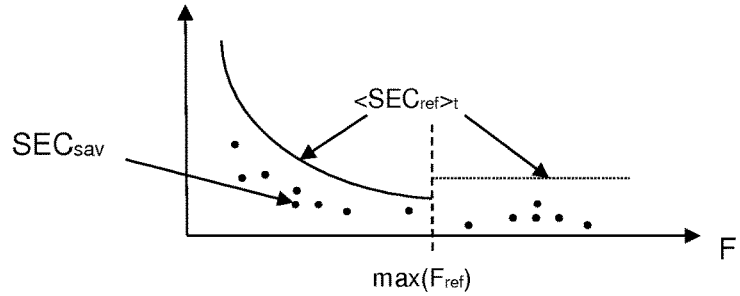

In FIG. 3 there is shown the creation of an interpolated reference curve for $<SEC_{ref}>_t$ over the flow range. This is then used in accordance with FIG. 4 to calculate the difference between $<SEC_{ref}>_t$ and $SEC_s(t)$ (a), or $<SEC_{sav}>_t$ (b), i.e. by use of $SEC_{sav}(t,F)$ or $<SEC_{sav}>_t(F)$, over a range of common output flow F in the compressor system. As seen in FIG. 4, this may then be used to calculate the energy savings, given by the equation $$E_{save}(x)=(<SEC_{ref}>_t(x)-SEC_{sav}(t,x))*V_{sav}(t,x) \text{ or } E_{save}(F)=(<SEC_{ref}>_t(F)-<SEC_{sav}>_t(F))*V_{sav}(F),$$

which in turn may provide the total energy savings as the sum of incremental energy savings.

Figure 5:
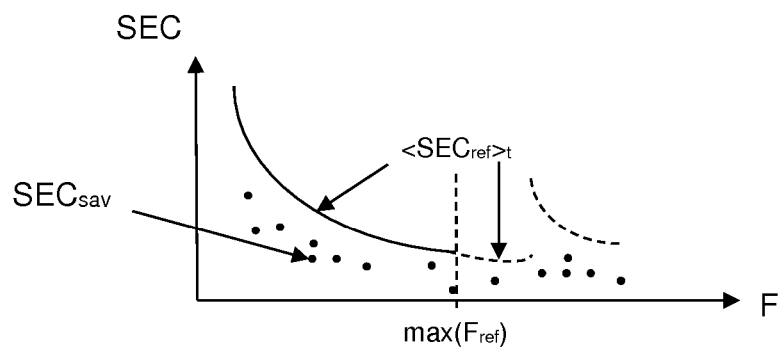

In FIGS. 5a-c there are provided different embodiments of the method according to the present invention, when setting values when $F_{sav} > \max(F_{ref})$, that is above the measured maximal common output flow. A first alternative is presented in FIG. 5a. In this case $<SEC_{ref}>_t(F_{sav})$ is set as $<<SEC_{ref}>_t>_v = \Sigma_F E_{ref}/\Sigma_F V_{ref}$. The graphs beneath the equation show that the areas provide the sums needed.

According to FIG. 5b another embodiment of the method according to the present invention is shown. In this case, the Δ (difference) of $<SEC_{ref}>_t(F)$ and $SEC_{sav}(t,F)$ in $\max(F_{ref})$ during $T_{ref}$ is used to also calculate $<SEC_{ref}>_t(F)$ for a F larger than $\max(F_{ref})$. This is shown by the equation shown in FIG. 5b and also in the presented graph.

Furthermore, in FIG. 5c yet another embodiment of the present invention is shown. As stated in the equation, in this case $<SEC_{ref}>_t(F_{sav})=f(F)$, where $f(\max(F_{ref}))=<SEC_{ref}>_t(\max(F_{ref}))$ and f(F) is piecewise continuous. According to this embodiment, the $<SEC_{ref}>_t(F)$ for a F larger or smaller than the highest or lowest F, respectively, measured during $T_{ref}$ may be modelled as a continuous extrapolation of $<SEC_{ref}>_t(F)$.

NOMENCLATURE

| Expression | Description |
|---|---|
| E | Energy in units of kWh. Accumulates with time. |
| E(F) (similarly for any other quantity) | Energy consumed as a function of flow or as a histogram with respect to flow depending on the situation. Example: Flow is constant at 100 m^3/min. Then E(F) is zero everywhere except at F = 100 m^3/min where all energy is collected, so E(100 m^3/min) = $\Sigma_F E$ |
| E(t, F) (similarly for any other quantity) | Energy as a function of time and flow |
| $E_{save}$ | Saved energy. $E_{save} = E_{ref} - E_s$ |
| P | Power in units of kW. Is always a function of time unless averaged or summed over time. |
| V | Volume in units of m^3. Accumulates over time. |
| F | Flow in units of m^3/min. Is always a function of time unless averaged or summed over time. |
| SEC | Specific energy consumption in units of kWh/m^3 |
| $T_{ref}$ | A time period for measurement of reference data |
| $T_{sav}$ | A time period for measurement of sample data to be compared with the reference data |
| $<X>_t$ | An average of X over a time duration. For instance $<SEC>_t(F)$ is SEC averaged over some time duration and as a function of F. |
| $X_{ref}$ | A quantity or value belonging to the reference data |
| $X_{sav}$ | A quantity or value belonging to the sample |

-continued

| Expression | Description |
|---|---|
|  | data to be compared with the reference data |
| $\Sigma_F X(F)$ | A sum of X over all values of flow (X has to be a function of F) |
| $<X_{ref}>_t$ | A quantity time averaged over the time period $T_{ref}$ |
| $<<X>_t>_V$ | Average X over time, then over volume. |

The invention claimed is:

1. A method for analyzing energy used for producing a unit of mass or volume of compressed gas (Specific Energy Consumption) in relation to a common output flow in a compressor system, said method comprising the following steps:

for time interval, $T_{ref}$, collecting reference measured data points of common output flow $F_{ref}$ and energy (or power) consumption $E_{ref}$ (or $P_{ref}$) in the compressor system;

calculating energy (or power) use as a function of the common output flow $E_{ref}(F)$ (or $<P_{ref}>_t(F)$) from the measured data points and calculating volume output as a function of the common output flow $V_{ref}(F)$;

calculating average energy consumed for producing a unit of mass or volume of compressed gas as a function of the common output flow $<SEC_{ref}>_t(F)$ from equation $E_{ref}(F)/V_{ref}(F)$ (or $<P_{ref}>_t(F)/F_{ref}$);

for time interval, $T_{sav}$, collecting measured data points of common output flow $F_{sav}$ and energy (or power) consumption $E_s$ ($P_s$) in the compressor system;

calculating energy consumed for producing a unit of mass or volume of compressed gas as a function of the common output flow $<SEC_{sav}>_t(F)$ from equation $E_{sav}(F)/V_{sav}(F)$ (or $<P_{sav}>_t(F)/F_{sav}$) or $SEC_{sav}(t,F)$ from $P_{sav}/F_{sav}$;

calculating the difference between $<SEC_{ref}>_t(F)$ and $<SEC_s>_t(F)$ or $SEC_{sav}(t,F)$ over a range of common output flow F in the compressor system.

2. The method according to claim 1, wherein the method involves using $E_{ref}(F)$, $V_{ref}(F)$, $P_{sav}$, $F_{sav}$ and $E_{ref}(F)/V_{ref}(F)$ and $P_{sav}/F_{sav}$ in the calculations.

3. The method according to claim 1, wherein the method involves collecting data during $T_{ref}$, then performing changes to the compressed system, then collecting data during the time interval $T_{sav}$, and finally comparing the data.

4. The method according to claim 1, wherein $<SEC_{ref}>_t(F)$ and $V_{ref}(F)$ are partly or fully simulated, constructed or are from a different compressed system than $<SEC_{sav}>_t(F)$ (or $SEC_{sav}(t,F)$) and $V_{sav}(F)$ (or $V_{sav}(t,F)$).

5. The method according to claim 1, wherein the steps of calculating are performed over the full range of common output flow $F_{sav}$ in the measured data points during $T_{sav}$.

6. The method according to claim 1, wherein the measurement during $T_{sav}$ is performed in a single data point.

7. The method according to claim 1, wherein the method involves using only a subset of the data during $T_{ref}$ or $T_{sav}$.

8. The method according to claim 1, wherein the method involves detecting data points involving data errors and marking or removing these error data points.

9. The method according to claim 1, wherein the energy saving at flow F is calculated as $E_{SAVE}(F)=(<SEC_{ref}>_t(F)-<SEC_{sav}>_t(F))*V_{sav}(F)$ or $E_{SAVE}(F)=(<SEC_{ref}>_t(F)-SEC_{sav}(t,F))*V_{sav}(t,F)$ where F refers to any common output flow over the full range of measured data points.

10. The method according to claim 9, wherein the total energy saving is calculated as $\Sigma_F E_{SAVE}(F)$.

11. The method according to claim 10, wherein the total cost saving is calculated as $\Sigma_F E_{SAVE}(F)*Cost$, where Cost is the cost in any monetary instrument per unit of energy.

12. The method according to claim 1, wherein $SEC_{sav}(t,F)$ and $F_{sav}$ are simulated data to analyze savings for a simulated period in time $T_{sav}$.

13. The method according to claim 1, wherein any or several of the functions of $E_{ref}(F)$, $<P_{ref}>_t(F)$, $V_{ref}(F)$, $<SEC_{ref}>_t(F)$ and energy saving $E_{SAVE}(F)$ are plotted as a function against F.

14. The method according to claim 13, wherein the $<SEC_{ref}>_t(F)$ for a F larger or smaller than the highest or lowest F, respectively, measured during $T_{ref}$ is modelled as a piecewise continuous extrapolation of $<SEC_{ref}>_t(F)$.

15. The method according to claim 14, wherein the model that is used to extrapolate $<SEC_{ref}>_t(F)$ includes the situation that one or several compressors are operating their blow off valves.

16. The method according to claim 14, wherein the model that is used to extrapolate $<SEC_{ref}>_t(F)$ includes the situation that one or several compressors are regulating using IGVs or VSDs.

17. The method according to claim 1, wherein $<SEC_{ref}>_t(F)$ is calculated for a F having no measured data during $T_{ref}$.

18. The method according to 17, wherein the method also comprises deciding $<SEC>_{ref}(F)$ for a F larger than the highest F, $max(F_{ref})$, in the data points during $T_{ref}$.

19. The method according to claim 17, wherein the $<SEC_{ref}>_t(F)$ for a F larger than $max(F_{ref})$ in the data points is set and calculated as: $<SEC>_{ref}(F)=<<SEC>_t>_V=\Sigma_F E_{ref}(F)/\Sigma_F V_{ref}(F)$.

20. The method according to claim 17, wherein the $<SEC_{ref}>_t(F)$ for a F larger than $max(F_{ref})$ in the data points is set and calculated by calculating $\Delta$ (difference) of $<SEC_{ref}>_t(F)$ and $SEC_{sav}(t,F)$ in $max(F_{ref})$ during $T_{ref}$ and using the same $\Delta$ for an F larger than $max(F_{ref})$ in the data points to set and calculate the $<SEC_{ref}>_t(F)$ for this F.

21. The method according to claim 1, wherein the method comprises calculating and setting different $<SEC_{ref}>_t(F)$ curves as a function of F for different values of a third parameter.

22. The method according to claim 21, wherein the third parameter is operational pressure for the compressor system.

23. The method according to claim 21, wherein the method also comprises plotting the different $<SEC_{ref}>_t(F)$ curves to set a $<SEC_{ref}>(F, X)$ plane as a function of F and the third parameter, X.

24. The method according to claim 1, wherein the compressor system comprises multiple compressors.

* * * * *